Patented Aug. 17, 1948

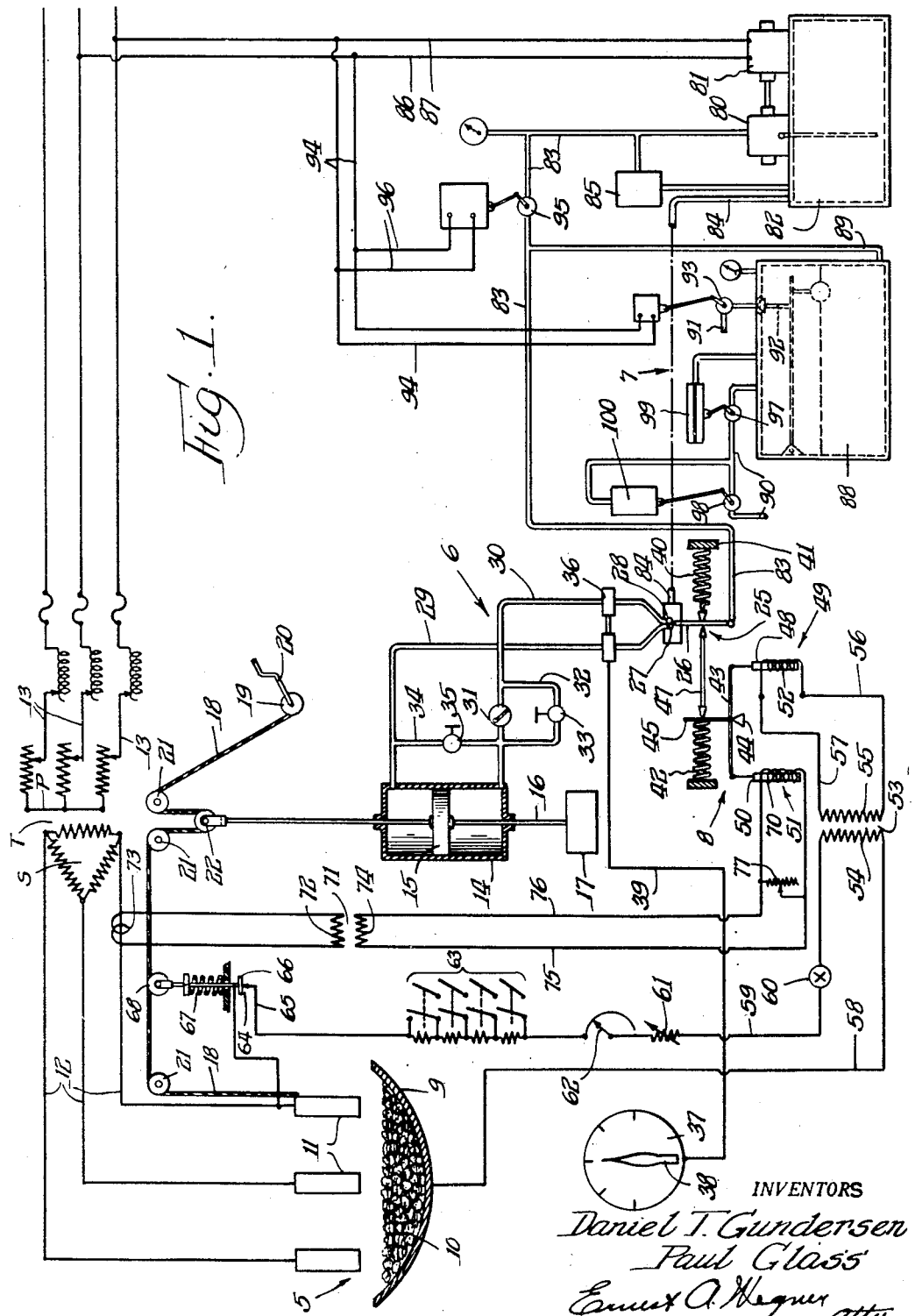

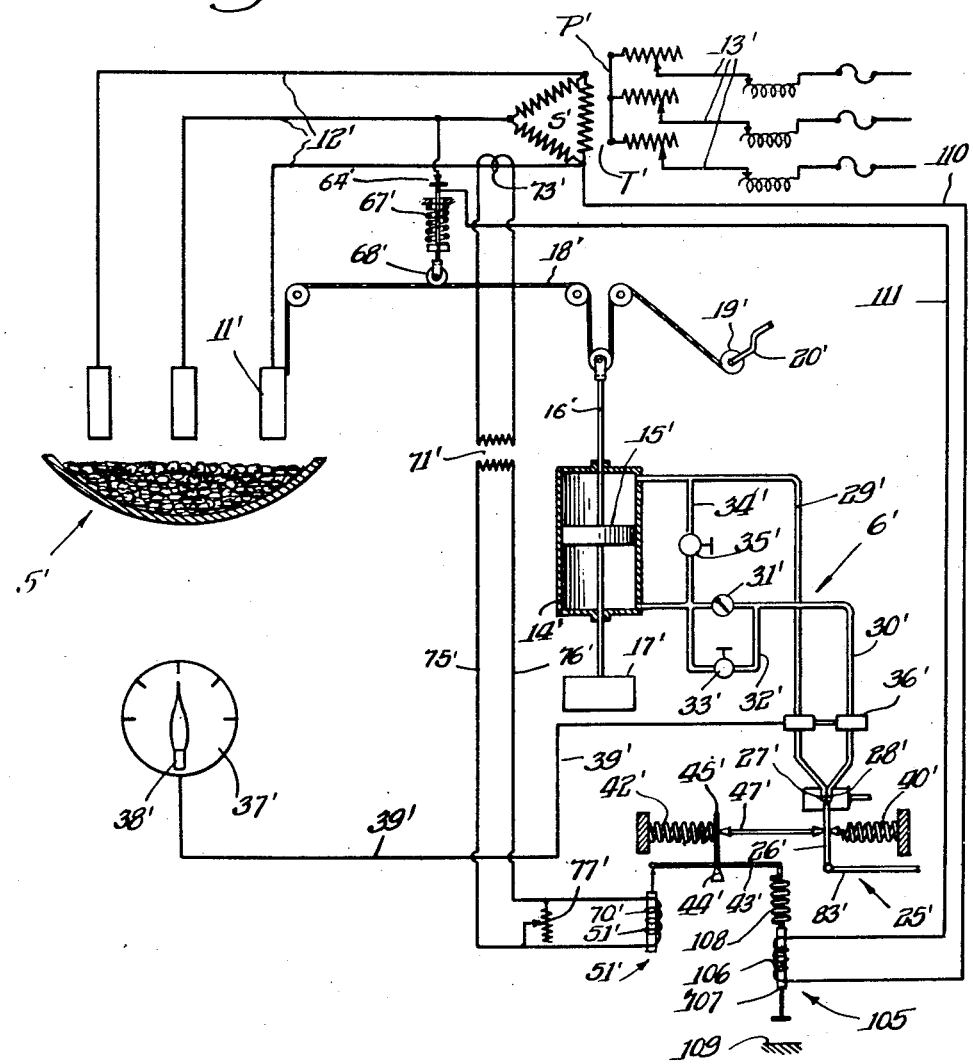

2,447,066

UNITED STATES PATENT OFFICE 2,447,066

ELECTRIC ARC FURNACE CONTROL SYSTEM

Daniel T. Gundersen and Paul Glass, Chicago, Ill., assignors to Askania Regulator Company, Chicago, Ill., a corporation of Illinois Application December 2, 1943, Serial No. 512,520

15 Claims. (Cl. 314—61)

1

The invention relates to an electric arc furnace control system and has as a general object the provision of a new and improved system of the character described.

Among the more particular objects of the invention is the provision of a new and improved combination hydraulic and electric control system for an electric arc furnace.

Another object of the invention is to provide a control system that is highly sensitive and quickly responsive yet is stable, rugged and simple.

Another object is to provide a control system having provision for automatic and rapid withdrawal of electrodes from the melt in case of power failure to the furnace and for like withdrawal in the event of power failure to the entire system.

Still another object is to provide a control system governed primarily by the current flow through the electrodes but including means for withdrawing an electrode in the event it strikes the melt without an arc forming.

Other objects and advantages will become apparent from the following detailed description taken in connection with the accompanying drawings, in which:

Fig. 1 is a diagrammatic view illustrating an electric arc furnace control system embodying the features of this invention.

Fig. 2 is a fragmentary diagrammatic view illustrating a modified construction of the electrical control portion of the system.

While the invention is susceptible of various modifications and alternative constructions, it is here shown and will hereinafter be described in a preferred embodiment and one modification. It is not intended, however, that the invention is to be limited thereby to the specific forms disclosed. On the contrary, it is intended to cover all modifications and alternative constructions falling within the spirit and scope of the invention as defined in the appended claims.

The electric arc furnace control system as disclosed by way of example in Fig. 1 comprises, generally, an electric arc furnace 5, power means, generally designated 6, for effecting movement of the electrodes of the furnace toward or from the melt therein, safety means, generally designated 7, and electrical control means 8 for the power means operable to maintain the electrodes of the furnace in desired position. The electric arc furnace 5 like the remainder of the construction, is shown diagrammatically only, with 9 representing the main portion of the furnace holding the melt 10. The furnace is of the three-phase type and thus has three electrodes 11 each independently movable toward or from the melt. Power is supplied to the electrodes through a transformer T having a Y-connected primary P

2 and a delta-connected secondary S with a lead 12 extending from each point of the delta to one of the electrodes 11. Preferably taps are provided either on the secondary or on the primary of the transformer to obtain different power inputs to the arc. Herein such taps 13 are indicated as provided on the primary winding P.

Each of the electrodes 11, as already stated, is movable independently of the other electrodes and to that end each has its own power means 6 and its own electrical control means 8. Inasmuch as the power means and the electrical control system are the same for each of the electrodes 11, only one such power means and one such control system is herein disclosed and will hereinafter be described. It is not to be overlooked, however, actually three such power means and electrical control systems are employed. To gain the advantage of rapid acceleration and deceleration, instantaneous reversal, and other advantages that will become apparent as the description proceeds, the power means comprises a hydraulic motor which herein takes the form of a reciprocatory piston motor having a cylinder 14 with a port opening to each end thereof and a piston 15 reciprocable therein. A piston rod 16 extends in both axial directions from the piston 15 and through the ends of the cylinder 14 in order that there may be no difference in volume between opposite ends of the cylinder. At one end the piston rod 16 has secured thereto a counterweight 17 designed to balance the weight of an electrode 11. At its other end, the piston rod 16 is adapted for operative engagement with one of the electrodes 11. While the means for transmitting the motion and the force of the piston 15 to the electrode may vary greatly, it is here shown as composed of a cable 18 connected at one end to an electrode 11 and at the other end wound about the drum 19 of a winch 20. The cable 18, of course, runs over properly positioned pulleys 21. Carried by the end of the piston rod 16 is a pulley 22 engaging the cable 18 intermediate the winch and the electrode in a manner to effect power lifting of the electrode with gravity relied upon to lower the electrode, that is, move it toward the melt. The winch 20 is preferably hand operated, providing for manual raising or lowering of the electrode where necessary or desired.

The fluid supplied to the cylinder 14 is governed by a regulator, generally designated 25, which herein is of the "Askania" jet type. Such a regulator comprises generally a jet pipe 26 from which fluid under pressure is discharged. The jet is directed against a plate having a pair of closely adjacent orifices 27 and 28 formed therein with the jet pipe movably mounted, preferably pivoted, so that it may be directed to impinge to an equal degree upon both orifices or to a greater degree on one and a lesser degree on the other of the orifices. While the jet pipe might discharge a variety of fluids and act to govern the supply of fluid to the cylinder 14 indirectly, that is, through other devices, the fluid herein discharged by the jet pipe 26 is oil and is the same oil that is supplied to the cylinder 14 in order to obtain more direct and more immediate response to any movement of the jet pipe 26. To that end, there leads from the orifice 27 a conduit 29 connected to the port opening to the upper end of the cylinder 14, as viewed in Fig 1. Leading from the orifice 28 is a conduit 30 connected to the port opening to the lower end of the cylinder 14. Interposed in the conduit 30 is a check valve 31 operating to close and prevent flow of fluid through the conduit 30 to the lower end of the cylinder 14, but opening to permit the free and unrestricted flow of fluid out of the lower end of the cylinder 14. Connected in shunt around the check valve 31 is a conduit 32 having therein a manually adjustable metering valve 33. Connected between the conduits 29 and 30 is an interconnecting conduit 34 having a manually actuable shut off valve 35 interposed therein. Interposed in the conduits 29 and 30 adjacent their point of connection to the orifices 27 and 28 is a rotary main control valve of any well known construction capable either of rendering the power means operable for automatic control, that is, control by the regulator 25 or to cut off the regulator and to cause fluid to be supplied under pressure either to the upper end of the cylinder 14 to raise the electrode 11 or to the lower end of the cylinder 14 to lower the electrode 11. It is frequently necessary to regulate such a valve 36 from a remote point. Such remote control of the valve 36 is here represented by the dial 37, handle 38, and suitable means represented at 39 for interconnecting the handle 38 and the valve 36.

The jet pipe 26 of the regulator 25 is, by a compression spring 40, biased in a direction to effect raising of the electrode 11. This spring bears at one end against the jet pipe 26 and at the other end against an adjusting wheel 41 carried on a stationary portion of the regulator. Optionally there may or may not be present in the regulator a second compression spring 42 acting in opposition to the spring 40. This spring 42 is also a compression spring bearing at one end against a stationary portion of the regulator, with the other end acting on the jet pipe 26, but the spring 42 is never strong enough to overcome the spring 40.

Controlling the regulator, which in turn controls the power means 6, is the electrical control system 8, heretofore mentioned, designed to be responsive to certain characteristics of the arc in order that some ultimate and desired condition in the arc may be maintained. To that end, there is associated with the regulator 25 means providing a torque couple, herein composed of components representative of the current flowing in the arc and the voltage across the arc. This means includes a beam balance 43 pivoted intermediate its ends on a fulcrum 44 and having rigid with it and extending at right angles from its fulcrum point an arm 45 against which one end of the spring 42 bears. Interposed between the arm 45 and the jet pipe 26 is a motion transmitting member 47. Pivotally depending from one end of the beam balance 43 is a core 48 of a solenoid 49, while pivotally depending from the opposite end of the beam balance is a core 50 of a solenoid 51. The solenoid 49 is made responsive to the voltage across the arc and to that end has a coil 52 which is preferably energized by the voltage across the arc through a transformer 53 having a primary winding 54 and a secondary winding 55. The secondary winding is connected to the coil 52 through leads 56 and 57. One terminal of the primary winding 54 is by a lead 58 connected to the metallic shell forming a part of the main melt holding portion 9 of the electric furnace. The other terminal of the primary winding 54 is connected to the lead 12 by a lead 59 which has incorporated therein a light 60, a variable resistance 61, an adjustable rheostat 62, a plurality of tap switch resistors 63 and a switch 64. The tap switch resistors 63 are provided to permit adjustment of the circuit for the coil 52 in accordance with the voltage applied to the power transformer as determined by the changing taps 13. By means well known in the electrical art, these resistors may be cut in or out of circuit by the same means which changes the taps of the power transformer T. The rheostat 62 actually serves as a means for regulating the current that will flow in the electric arc, while the variable resistance 61 functions in conjunction with the spring 40 to vary the sensitivity of control. The sensitivity is increased as the force of the spring 40 is decreased and herein the sensitivity can be made very great, namely, full control speed for as little as two or three per cent of load change. For practical purposes, however, the sensitivity should be adjusted for full speed for all deviations greater than ten per cent load change, and speed proportional to load change for all deviations less than ten per cent.

It is to be borne in mind that the electrical control system shown in Fig. 1 is for one electrode only. The complete system will, of course, have three solenoids 49 and hence three transformers 53, each with its primary winding 54. In this complete system, the primary windings 54 of the three transformers 53 are Y-connected across the secondary S of the transformer T, with the lead 58 being the common lead from the center or common tap of the Y-connected windings 54 to the shell of the furnace. With this connection, the coil 52 of all of the solenoids 49 will be energized immediately upon the application of electrical energy to the transformer T, even though no arc has been established in the furnace, the windings 54 being in well known manner in pairs across the windings of the secondary S of the transformer T. With the establishment of an arc, each winding 54 becomes responsive to the voltage across the arc of the particular electrode with which the winding is associated.

The switch 64 is under the control of the cable 18 and functions to cause the electrode to be raised whenever the cable 18 becomes slack. Accordingly, the switch 64 has a stationary contact 65 and a movable contact 66, with the movable contact urged away from the stationary contact by a compression spring 67. Carried by the movable contact 66 is a pulley or follower 68 positioned to ride on the cable 18 with the switch as a whole so positioned that when the cable is taut, that is, when the electrode is supported by the cable clear of the melt, the switch will be closed, but immediately upon appearance of any slack in the cable the spring 67 will cause the switch to open, thereby breaking the circuit to the transformer 53 and deenergizing the solenoid 49, resulting in immediate raising of the electrode by the hydraulic motor.

The solenoid 51 has a coil 70 similar to the coil 52, and this coil is energized in accordance with the current flowing in the arc with the energization again effected through a transformer 71. The primary 72 of this transformer is connected to the coil 73 of a current transformer, while the secondary winding 74 is by leads 75 and 76 connected to the coil 70. Connected across the leads 75 and 76, and parallel with the coil 70 to adjust the response thereof to the current flowing in the arc, is a variable resistance 77. The coils 52 and 70 are chosen with a view to providing suitable torque values in the beam 43 for the smallest current and voltage to be controlled. For greater current and voltage values up to the maximum loads, the torque values will be maintained the same as for the minimum loads by means of the variable resistances 61 and 77, so as to maintain maximum sensitivity at all loads.

The fluid discharged from the jet pipe to actuate the hydraulic motor is supplied by a pump 80 driven by an electric motor 81. The pump draws fluid from a reservoir 82 and discharges it to a conduit 83 leading to the jet pipe 26. The fluid discharged from the jet pipe 26 is collected by suitable and conventional means and returned to the reservoir 82 by a conduit 84. A pressure relief valve 85 is connected to the conduit 83 to provide a by-pass return of fluid to the reservoir 82 should the pressure in the conduit 83 rise above the value for which the relief valve is adjusted.

The motor 81 may by leads 86 and 87 be connected to one phase of the circuit supplying the power transformer T. The motor, being an electric motor, the pump would discontinue to operate and hence no fluid would be supplied by the pump to the jet pipe in the event of electric power failure. In order that the electrode 11 may, under such circumstances, be raised to withdrawn position, so as to reduce the possibility of injury to it, provision is herein made for an auxiliary supply of fluid which comes into play under such circumstances. To that end, there is provided an auxiliary reservoir 88 intended to be filled to a certain level with oil and maintained under desired pressure by compressed air. Leading from the bottom of the auxiliary reservoir 88 to the conduit 83 is a conduit 89, so that the oil from the reservoir 88 may take the place of the oil normally supplied by the pump 80 in the event of electric power failure. Opening to the top of the reservoir is an air supply conduit 90 receiving its supply of air from a suitable source (not shown). Also opening to the top of the auxiliary reservoir is an air vent passage 91 normally controlled by a float valve means 92 provided to assure maintenance of the proper quantity of oil in the reservoir. Additionally associated in controlling relation to the air vent 91 is a solenoid actuated valve 93 connected by leads 94 to the leads 86 and 87 and operable when energized to remain open, but when deenergized to close the air vent 91. A second solenoid actuated valve 95 is interposed in the conduit 83 intermediate the pump and the point of discharge of the conduit 89 to the conduit 83. This valve is by leads 96 connected to the leads 94 and functions when energized to remain open, and, upon deenergization, to close so as to prevent the fluid from the auxiliary reservoir to discharge backwardly through the pump 80. In order to assure the maintenance of adequate air pressure in the top of the reservoir, two valves 97 and 98 are interposed in the air supply conduit 90. The valve 97 is actuated by a pressure responsive device 99 connected to be responsive to the air pressure in the top of the auxiliary reservoir and functioning to open the valve when the pressure in the reservoir drops below a desired value, for example, one hundred pounds per square inch. Valve 98 is also actuated by a pressure responsive device 100 which is connected to be responsive to the pressure in the conduit 90 between the valves 97 and 98 and functions in the opposite manner, namely, to close the valve 98 when the pressure in the conduit 90 drops below the desired pressure. By this valve, loss of air pressure from the reservoir 88 is avoided in the event of the failure of the air supply source.

For a more ready understanding of the invention, the operation thereof will be briefly described. Let it be assumed that the control handle 38 has been rotated to automatic position, thereby causing the main valve 36 to assume a position whereby the hydraulic motor is under the control of the regulator and the electric control system. Let it be further assumed that the taps 13 have been adjusted to provide the desired power to the furnace, but that no power is as yet being supplied, that the resistors 63 have been correspondingly adjusted, that the rheostat 62 has been adjusted to give the desired current value in the electric arc, and that resistances 61 and 77 have been adjusted to provide the desired sensitivity of control. Let it also be assumed that the motor 81 has been started and is driving the pump 80 so that fluid under pressure is being discharged from the jet pipe 26. Inasmuch as there is no voltage on the furnace and hence no energization of the voltage coil 52, the spring 40 will overcome the spring 42 and pivot the jet pipe 26 counter-clockwise, as viewed in Fig. 1, so as to impinge upon the orifice 27, thereby supplying fluid to the upper end of the cylinder 14 forcing the piston 15 downwardly to raise the associated electrode 11. This condition is, of course, true for each of the three electrodes.

If now power is supplied to the primary of the transformer T, the voltage coil 52 of the solenoid 49 is energized because the switch 64 is closed since the cable is taut and supporting the electrode, and because the winding 54 is connected across one leg of the secondary S as above described. The coil 70 of the current solenoid 51, however, remains deenergized because as yet no arc has been established. Thus the coil 52 will attract its core 48 with such force as to overcome the spring 40 and cause pivoting of the jet pipe 26 in a clockwise direction. The fluid discharged from the jet pipe 26 will now impinge upon the orifice 28, thereby supplying fluid to the lower end of the cylinder 14 and causing a raising of the piston 15 with resultant lowering of the associated electrode 11. It is to be noted that though the fluid discharged from the jet pipe 26 impinges squarely on the orifice 28, the rate at which fluid is supplied to the lower end of the cylinder 14 is controlled by the metering valve 33, since valve 31 prohibits the flow of fluid to the cylinder, thereby assuring that the electrode will not descend so rapidly as to strike the melt with sufficient force to break the electrode. Normally all of the electrodes strike the melt substantially simultaneously, with the result that arcs are established from one electrode to the other through the melt. As soon as the arcs are established, the current flows through leads 12 and hence the current coil 70 will be energized to attract its core 50 and add its force to that of the spring 40. While the electrodes are closely adjacent the melt, the arc is short and hence the current flow is high and the voltage across the arc is low and the coil 70 is then strongly enough energized to overcome, with the aid of the spring 40, the force of the voltage coil 52. The jet pipe 26 will then be pivoted counterclockwise, causing impingement of its jet to a greater extent upon the orifice 27 than upon the orifice 28, resulting in a downward movement of the piston 15 and a raising or withdrawal of the electrode 11. As the electrode is raised, the arc, of course, becomes longer, the voltage drop increases while the current flow decreases, with a corresponding effect upon the voltage and current coils 52 and 70, respectively, correspondingly effected, with the result that presently a point is reached where the forces acting on the jet pipe 26 are balanced and the piston 15 then comes to rest and remains in that position so long as those conditions prevail. Should the arc, for some reason or other, extinguish, the current coil 70 would, of course, be immediately deenergized while the voltage coil 52 would remain energized and would, moreover, be strongly energized overcoming the spring 40 and causing the regulator to effect an immediate lowering of the electrode until the arc is again re-established and extended to a length producing the desired current flow. Should the melt cave in, so as to shorten the length of the arc, the current coil 70 would be more strongly energized, while the voltage coil 52 would be less strongly energized, resulting in the regulator causing the electrode to be raised. This would take place quickly because the conduit 29 leading from the orifice 27 to the upper end of the cylinder 14 is not restricted, with the result that the electrode would be withdrawn before harm could result thereto.

Should one of the electrodes, in the initiation of operation of the furnace, reach the melt so that it is either sufficiently in advance of the other two electrodes so that no arc is established, or if, for some other reason, no arc is established upon the reaching of the melt by the electrode, the system herein provided arrests further downward movement of the electrode which might result in breakage of the electrode, while at the same time maintaining the electrode hovering at the melt to permit establishment of the arc as soon as the conditions are proper. Thus, should the electrode strike the melt without an arc being established, slack would presently appear in the cable 18, with the result that switch 64 would open. This would deenergize the voltage coil 52, restoring the regulator to the control of the spring 40, which would then pivot the jet pipe 26 to cause movement of the piston 15 in a direction to raise the electrode. Such movement of the piston 15 in a direction to raise the electrode would again make the cable 18 taut, thereby closing the switch 64 energizing the voltage coil 52 which would overcome spring 40 and cause the regulator to supply fluid to the cylinder 14 in a manner to effect lowering of the electrode. Thus, it may be seen that the electrode would hover right at the melt until the arc is established. Should the cable 18, after establishment of the arc, become lax for any reason, such as a cave in of the melt, the switch 64 would be opened and the voltage coil 52 deenergized with resultant immediate and rapid movement of the piston 15 in a direction withdrawing the electrode.

Should there be a power failure, it would be desirable, of course, to withdraw the electrodes. This is accomplished herein, despite failure of the motor 81 to drive the pump 80, because of the reserve of fluid maintained under pressure. Power failure would result, of course, in deenergization of both the voltage coil 52 and the current coil 70, restoring control of the jet pipe 26 to the spring 40 exclusively, which would then pivot the jet pipe in a direction resulting in a raising of the electrode. Though the pump 80 would now fail to discharge fluid, a quantity of fluid sufficient to raise the electrode would be discharged from the auxiliary reservoir 86. The power failure would deenergize the solenoid valves 93 and 95, thereby closing the vent opening 91 and closing the valve 95 to prevent return flow of fluid from the auxiliary reservoir through the pump. Thus transition from a supply of fluid to the jet pipe from the pump to the auxiliary reservoir would take place instantaneously and without interruption of discharge from the jet. It is, of course, only necessary that the reservoir hold fluid sufficient to drive the piston 15 associated with each of the three electrodes through its electrode-raising stroke, for the weight of the electrode is counterbalanced and, once raised, remains in raised position without maintenance of a constant supply of pressure fluid to the upper end of the cylinder 14. Should even the air supply to the auxiliary reservoir fail, the air already in the reservoir and under pressure would be trapped by closure of the valve 98 which is actuated by a pressure responsive device responsive to the pressure in the air supply conduit 90 between the valves 97 and 98. This air under pressure trapped in the top of the reservoir is sufficient to effect a raising of the electrodes.

In the modified form of the invention shown in Fig. 2, provision is made whereby the system is solely responsive to the current flowing in the arc, as distinguished from the current-voltage responsiveness just described, while retaining the feature of causing an electrode to hover above the melt until an arc is established. This is accomplished in the modified form by change in the voltage responsive means only, the remainder of the system remaining as above described. Accordingly, where the systems are similar, the parts or elements shown in Fig. 2 have been designated by the same reference character plus a prime. Suffice it to say, therefore, that the modified form of the invention comprises an electric arc furnace 5' having three electrodes 11' supplied with electrical energy from a transformer T', the secondary S' of which has its windings connected in delta formation with each juncture or corner connected by a lead 12' to one of the electrodes 11'. Each electrode is moved toward or from the melt by a hydraulic motor having a cylinder 14' and a piston 15' with the piston 15' acting to raise or lower the electrode through the medium of a cable 17'. The supply of fluid to the cylinder 14' is under the control of a regulator 25' of the jet pipe type. This regulator includes, among other things, a compression spring 40' acting to pivot a jet pipe 26' in a direction to cause withdrawal of the electrode from the melt. Controlling the regulator is a means providing a torque couple including a beam 43' with a solenoid 51' associated therewith and operating in response to the current flowing through the arc of the electrode in aid of the compression spring 40', the same as previously described.

Adapted to act in opposition to the spring 40' is a solenoid 105 having a coil 106 and a core 107. The core is connected to the beam 43' at the end opposite the solenoid 51' through the medium of a tension spring 108 and movement of the core under the influence of the coil 106 when energized is limited by a stop 109 so that the bias produced by the solenoid is fixed and independent of the extent of energization of the coil 106. The coil 106 is adapted to be energized under normal conditions when voltage is applied to the electrode, though such energization is dependent upon the proper positioning of the electrode 11'. To that end, the coil 106 is connected across one phase of the secondary winding S' of the transformer T' by means of leads 110 and 111. Incorporated in the lead 111 is a switch 64' associated with the cable 18' to be closed when the cable is taut and to open upon the appearance of slack in the cable, which does occur when the electrode rests upon the melt.

The operation of this modified form of the invention is generally similar to that described for the preferred form, and it is believed, therefore, readily understandable. Suffice it to say, therefore, that with the application of electrical energy to the transformer T', the coil 106 is energized, pulling the core 107 downwardly to the limit of its movement as determined by the stop 109, thereby tensioning the spring 108 and thereby placing a bias on the regulator overcoming the spring 40', with the result that the regulator effects a lowering of the electrode by the hydraulic motor. If, as the electrode contacts the melt, an arc is established, the current coil of the solenoid 51' is energized which, as stated, acts in aid of the spring 40' so as to overcome the spring 108 and pivot the jet pipe 26' to effect a raising of the electrode. As the electrode is raised and the arc lengthened, the current flowing in the arc is, of course, reduced and, with the reduction in current, the strength of the solenoid 51' is reduced until such point that the jet discharged from the jet pipe 26' impinges equally upon the orifices 27' and 28' to arrest the hydraulic motor and, likewise, the electrode associated therewith. Should the electrode, upon lowering to the melt, strike the melt without establishing an arc and permit the cable 18' to become slack, the switch 64' is opened, breaking the circuit to the coil 106, thereby permitting the spring 40' to control and pivot the jet pipe 26' in a direction to cause raising of the electrode. As soon as the hydraulic motor starts to raise the electrode, the cable 18', of course, again becomes taut, thereby closing the switch and permitting the coil 106 of the voltage solenoid 105 again to be energized. This will again cause lowering of the electrode so that the electrode is maintained hovering above the melt. Should the voltage applied to the electrodes fail for some reason or other, or should the cable 18' become slack, as for example, upon the cave in of the melt, the solenoid 105 would be immediately deenergized causing raising of the electrode.

We claim as our invention:

1. In a control system for an electric arc furnace having an electrode to be moved toward or from the melt, a reversible hydraulic motor operatively associated with the electrode to move the same, means for governing the operation of said motor including a jet-type regulator having yieldable means biasing said regulator to cause said motor to withdraw the electrode from the melt, and means for governing said regulator to maintain a predetermined power input into the arc comprising means responsive to the voltage across the arc acting in opposition to said yieldable means, means responsive to the current flowing in the arc acting in aid of said yieldable means, and means in circuit with one of said responsive means adjustable to vary the response thereof.

2. In a control system for an electric arc furnace having an electrode to be moved toward or from the melt, a reversible hydraulic motor operatively associated with the electrode to move the same, means for governing the operation of said motor including a jet-type regulator having yieldable means biasing said regulator to cause said motor to withdraw the electrode from the melt, and means for governing said regulator comprising means responsive to the voltage across the arc acting in opposition to said yieldable means, means responsive to the current flowing in the arc acting in aid of said yieldable means, means in circuit with one of said responsive means adjustable to vary the response thereof, a switch in circuit with said voltage responsive means, and means controlling said switch closing it when the electrode is suspended above the melt and opening it when the electrode rests on the melt.

3. In a control system for an electric arc furnace having an electrode to be moved toward or from the melt, a reversible hydraulic motor operatively associated with the electrode to move the same, means for governing the operation of said motor including a jet-type regulator having yieldable means biasing said regulator to cause said motor to withdraw the electrode from the melt, and means for governing said regulator to maintain a predetermined power input into the arc comprising a first solenoid connected in circuit to be responsive to the voltage across the arc and acting in opposition to said yieldable means, a second solenoid connected in circuit to be responsive to the current flowing in the arc and acting in aid of said yieldable means, and a rheostat and a switch in circuit with said first solenoid, and means responsive to the state of the electrode as between suspension or resting on the melt controlling said switch to close when the electrode is suspended above the melt and to open when the electrode rests on the melt.

4. In a control system for an electric arc furnace having an electrode to be moved toward or from the melt, a reversible hydraulic motor, means operatively associating said motor with the electrode to move the same, means for governing the operation of said motor including a jet-type regulator having yieldable means biasing said regulator to cause said motor to withdraw the electrode from the melt, and means for governing said regulator to maintain a predetermined power input into the arc comprising means forming a torque couple mechanically associated with said regulator and including a first solenoid connected in circuit to be responsive to the voltage across the arc and acting in opposition to said yieldable means, a second solenoid connected in circuit to be responsive to the current flowing in the arc and acting in aid of said yieldable means, a rheostat in parallel with said second solenoid, and a rheostat and a switch in circuit with said first solenoid, said switch being responsive to the state of said first mentioned means closing when the electrode is suspended above the melt and opening when the electrode rests on the melt.

5. In a control system for an electric arc furnace having an electrode to be moved toward or from the melt, a reversible hydraulic motor operatively associated with the electrode to move the same, means for governing the operation of said motor including a jet-type regulator having a pivotally mounted jet and yieldable means biasing the jet in a direction to cause said motor to withdraw the electrode from the melt, and means for governing said regulator comprising a beam fulcrumed intermediate its ends, an arm rigidly extending at right angles to the beam from its fulcrum point, a movement transmitting member between said arm and said jet, a first solenoid connected in circuit to be responsive to the voltage across the arc and operatively connected to said beam at that side of its fulcrum enabling said solenoid to act in opposition to said yieldable means, a second solenoid connected in circuit to be responsive to the current flowing in the arc and operatively connected to said beam on the opposite side of its fulcrum to act in aid of said yieldable means, means in circuit with one of said solenoids adjustable to vary the response thereof, and a switch in circuit with said first solenoid, and means responsive to the state of the electrode as between suspension or resting on the melt controlling said switch to close when the electrode is suspended above the melt and open when the electrode rests on the melt.

6. In a control system for an electric arc furnace having an electrode to be moved toward or from the melt, a reversible hydraulic motor operatively associated with the electrode to move the same, said motor having a pair of ports, means for governing the operation of said motor including a jet-type regulator having a plate with a pair of closely adjacent orifices formed therein, a pivotally mounted jet through which fluid is discharged under pressure to impinge against said orifices and a spring biasing said jet to cause said motor to withdraw the electrode from the melt, a conduit leading directly from each orifice to one of said motor ports, means for continuously supplying fluid under pressure to be discharged from said jet, and means for governing said regulator comprising means responsive to the voltage across the arc acting in opposition to said spring, means responsive to the current flowing in the arc acting in aid of said spring, means in circuit with one of said responsive means adjustable to vary the response thereof, and a switch in circuit with said voltage responsive means, and means responsive to the state of the electrode as between suspension or resting on the melt controlling said switch to close when the electrode is suspended above the melt and to open when the electrode rests on the melt.

7. In a control system for an electric arc furnace having an electrode to be lowered toward or raised from the melt, a reversible hydraulic motor operatively associated with the electrode to move the same having a pair of ports through which fluid is alternately supplied or discharged to raise or lower the electrode, means for supplying fluid to said motor including a jet-type regulator having a plate with a pair of closely adjacent orifices formed therein, a pivoted jet through which fluid is discharged under pressure to impinge against said orifices, said jet being adjustable to impinge to a greater or lesser extent on said orifices, and a spring biasing said jet to cause said motor to withdraw the electrode from the melt, a conduit leading directly from each orifice to one of said motor ports, a check valve in the one of said conduits through which fluid is supplied to lower the electrode preventing flow therethrough, an adjustable metering orifice connected in parallel with said check valve and means for continuously supplying fluid under pressure to be discharged from said jet, and a plurality of electrical means responsive respectively to the current in and the voltage of the electric arc controlling said regulator through adjustment of said jet to maintain an arc of a desired character.

8. In a control system for an electric arc furnace having an electrode to be moved toward or from the melt, a reversible hydraulic motor operatively associated with the electrode to move the same, means for governing the operation of said motor including a jet-type regulator having a spring biasing said regulator to cause said motor to withdraw the electrode from the melt, and means for governing said regulator comprising means acting upon the application of voltage to the electrode to place upon said regulator a fixed bias acting in opposition to and overcoming said spring, and means responsive to the current flow through the electrode acting in aid of said spring.

9. In a control system for an electric arc furnace having an electrode to be moved toward or from the melt, a reversible hydraulic motor operatively associated with the electrode to move the same, means for governing the operation of said motor including a jet-type regulator having a spring biasing said regulator to cause said motor to withdraw the electrode from the melt, and means for governing said regulator comprising means acting upon the application of voltage to the electrode to place upon said regulator a fixed bias acting in opposition to and overcoming said spring, means responsive to the current flow through the electrode acting in aid of said spring, and means in circuit with said last named means adjustable to vary the response thereof.

10. In a control system for an electric arc furnace having an electrode to be moved toward or from the melt, a reversible hydraulic motor operatively associated with the electrode to move the same, means for governing the operation of said motor including a jet-type regulator having a spring biasing said regulator to cause said motor to withdraw the electrode from the melt, and means for governing said regulator comprising means including a coil connected to be energized upon the application of voltage to the electrode and operating to place upon said regulator a fixed bias acting in opposition to and overcoming said spring, means responsive to the current flow through the electrode acting in aid of said spring, and means in circuit with said last named means adjustable to vary the response thereof.

11. In a control system for an electric arc furnace having an electrode to be moved toward or from the melt, a reversible hydraulic motor operatively associated with the electrode to move the same, means for governing the operation of said motor including a jet-type regulator having yieldable means biasing said regulator to cause said motor to withdraw the electrode from the melt, and means for governing said regulator comprising a solenoid having a coil connected to be energized upon the application of voltage to the electrode and a core, a tension spring through which said core is connected to said regulator to place on said regulator, when the coil is energized, a bias acting in opposition to and overcoming said yieldable means, a stop adapted to be abutted by said core to place a fixed bias on said regulator independent of the strength of energization of said coil, means responsive to the current flow through the electrode acting in aid of said yieldable means, and means in circuit with said last named means adjustable to vary the response thereof.

12. In a control system for an electric arc furnace having an electrode to be moved toward or from the melt, a reversible hydraulic motor operatively associated with the electrode to move the same, means for governing the operation of said motor including a jet-type regulator having a spring biasing said regulator to cause said motor to withdraw the electrode from the melt, and means for governing said regulator comprising means acting upon the application of voltage to the electrode to place upon said regulator a fixed bias acting in opposition to and overcoming said spring, means operating when the electrode rests on the melt to render said last named means inoperative to place a fixed bias upon said regulator, and means responsive to the current flow through the electrode acting in aid of said spring.

13. In a control system for an electric arc furnace having an electrode to be moved toward or from the melt, a reversible hydraulic motor operatively associated with the electrode to move the same, means for governing the operation of said motor including a jet-type regulator having yieldable means biasing said regulator to cause said motor to withdraw the electrode from the melt, and means for governing said regulator comprising means including a coil connected to be energized upon the application of voltage to the electrode and operating to place upon said regulator a fixed bias acting in opposition to and overcoming said yieldable means, a switch in the circuit of said coil, means responsive to the position of the electrode relative to the melt controlling said switch to close when the electrode is suspended above the melt and to open when the electrode rests on the melt, means responsive to the current flow through the electrode acting in aid of said yieldable means, and means in circuit with said last named means adjustable to vary the response thereof.

14. In a control system for a device having an element to be lowered or raised, a reversible hydraulic motor operatively associated with the element to move the same having a pair of ports through which fluid is alternately supplied or discharged to raise or lower the element, means for supplying fluid to said motor including means for directing the fluid to one or the other of the ports of said motor, a spring biasing said fluid directing means to cause said motor to raise the element and electrical means associated with said fluid directing means and adaptable to act in opposition to said spring to control said fluid directing means, and means for continuously supplying fluid under pressure to be discharged from said fluid directing means comprising an electric motor driven pump normally supplying fluid at a predetermined pressure to said fluid directing means, a conduit leading from said pump to said fluid directing means, a solenoid operated valve in said conduit operable upon power failure to the pump motor to close said conduit, a reservoir of fluid maintained under pressure connected to said conduit intermediate said fluid directing means and said valve, an air vent for said reservoir, a float valve controlling the same to maintain a desired quantity of fluid in the reservoir, a second solenoid operated valve closing said air vent upon power failure to said pump motor, means including a conduit supplying air under pressure to said reservoir, a first and a second valve in said air supply conduit, said second valve being intermediate the air source and said first valve, a first pressure responsive means controlling said first valve to open the same upon a drop in air pressure in the reservoir below a predetermined value, and a second pressure responsive means controlling said second valve to close upon a drop in pressure between said first and second valves.

15. In a control system for an electric arc furnace having an electrode to be moved toward or from the melt, a reversible hydraulic motor operatively associated with the electrode to move the same, means for governing the operation of said motor including a jet-type regulator having a pivotally mounted jet and yieldable means biasing the jet in a direction to cause said motor to withdraw the electrode from the melt, and means for governing said regulator comprising a beam fulcrumed intermediate its ends, an arm rigidly extending at right angles to the beam from its fulcrum point, a movement transmitting member between said arm and said jet, a first solenoid connected in circuit to be responsive to the voltage across the arc and operatively connected to said beam at that side of its fulcrum enabling said solenoid to act in opposition to said yieldable means, a second solenoid connected in circuit to be responsive to the current flowing in the arc and operatively connected to said beam on the opposite side of its fulcrum to act in aid of said yieldable means, and means in circuit with one of said solenoids adjustable to vary the response thereof.

DANIEL T. GUNDERSEN.
PAUL GLASS.

REFERENCES CITED

The following references are of record in the file of this patent:

UNITED STATES PATENTS

| Number | Name | Date |
|---|---|---|
| Re. 13,483 | Kingwell | Oct. 29, 1912 |
| 294,455 | Earle et al. | Mar. 4, 1884 |
| 324,311 | Fiske | Aug. 11, 1885 |
| 383,226 | Hohenstein | May 22, 1888 |
| 797,664 | Cottingham | Aug. 22, 1905 |
| 840,876 | Steedman | Jan. 8, 1907 |
| 1,017,557 | Kieser | Feb. 13, 1912 |
| 1,282,478 | Smith | Oct. 22, 1918 |
| 1,537,437 | Graffinberger | May 12, 1925 |
| 1,562,204 | Carlstedt | Nov. 17, 1925 |
| 1,646,048 | Wirz | Oct. 18, 1927 |
| 1,658,049 | Howse | Feb. 7, 1928 |
| 1,799,112 | Miedbrodt | Mar. 31, 1931 |
| 1,959,889 | Wunsch | May 22, 1934 |
| 1,983,781 | Shippy | Dec. 11, 1934 |
| 2,000,270 | Andrews | May 7, 1935 |
| 2,007,602 | Goodspeed | July 9, 1935 |
| 2,033,032 | Jennings | Mar. 3, 1936 |
| 2,132,338 | Ziebolz | Oct. 4, 1938 |
| 2,161,804 | Dinzl | June 13, 1939 |
| 2,225,518 | Blasig | Dec. 17, 1940 |
| 2,229,218 | Meier | Jan. 21, 1941 |
| 2,239,566 | Mercier | Apr. 22, 1941 |
| 2,244,420 | Dinzl | June 3, 1941 |
| 2,276,338 | Potter | Mar. 17, 1942 |
| 2,348,676 | Flowers | May 9, 1944 |